United States Patent
Yokose et al.

(10) Patent No.: US 6,549,663 B1
(45) Date of Patent: Apr. 15, 2003

(54) IMAGE PROCESSING APPARATUS AND METHOD

(75) Inventors: Taro Yokose, Nakai (JP); Ikken So, Nakai (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/303,667

(22) Filed: May 3, 1999

(30) Foreign Application Priority Data

Jun. 30, 1998 (JP) .......................................... 10-184440

(51) Int. Cl.⁷ .............................. G06K 9/36; G06K 9/54
(52) U.S. Cl. ........................ 382/232; 382/284; 382/305
(58) Field of Search ................................ 382/232, 233, 382/238, 248, 284, 276, 305, 312; 345/629, 541–544, 556, 567

(56) References Cited

U.S. PATENT DOCUMENTS

| | | | | |
|---|---|---|---|---|
| 5,838,336 A | * | 11/1998 | Ross | 345/508 |
| 5,917,947 A | * | 6/1999 | Ishida et al. | 382/232 |
| 5,926,188 A | * | 7/1999 | Kawamoto et al. | 345/629 |
| 5,936,616 A | * | 8/1999 | Torborg, Jr. et al. | 345/202 |

FOREIGN PATENT DOCUMENTS

| | | |
|---|---|---|
| JP | 5-31974 | 2/1993 |
| JP | 5-37789 | 2/1993 |

OTHER PUBLICATIONS

Postscript, *"Postscript Reference Manual, Second Edition"*, Adobe Systems, Ascii, pp. 538–585.

M. Takagi et al., *"Image Analysis Handbook"*, Tokyo University Press, 1991, pp. 168–171.

* cited by examiner

Primary Examiner—Bhavesh Mehta
Assistant Examiner—Kanji Patel
(74) Attorney, Agent, or Firm—Oliff & Berridge, PLC

(57) ABSTRACT

An image processing apparatus for overwriting image data at a low cost and high speed. An image input unit sequentially inputs partial data of an image data. An overwriting unit overwrites a non-coded partial data stored in a compressed page memory with the input partial image data and stores the result in a small area buffer. A process prediction unit analyzes a plurality of image data that are objects of an overwriting process, and predicts whether further overwriting is performed. When it is predicted that no further overwriting is performed, the partial image data is coded in a coder and updated in the compressed page memory. When it is predicted that a further overwriting is performed, the non-coded image data is updated in the compressed page memory. When the overwriting process of every partial image data of all of the image data is complete, the overwritten image data is stored as code data in the compressed page memory.

17 Claims, 20 Drawing Sheets

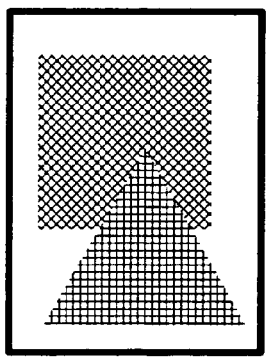
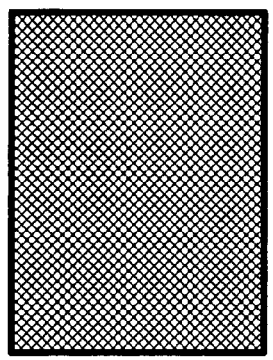
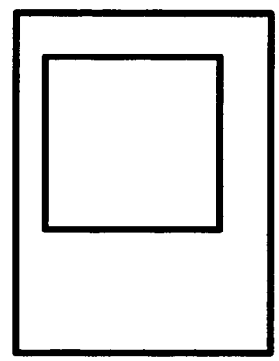
Fig. 3A　　　　　Fig. 3B　　　　　Fig. 3C
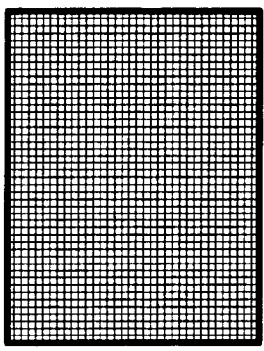
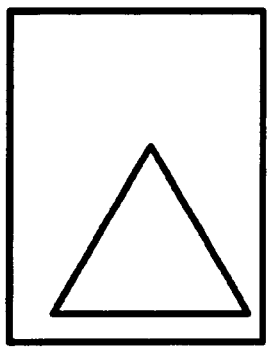
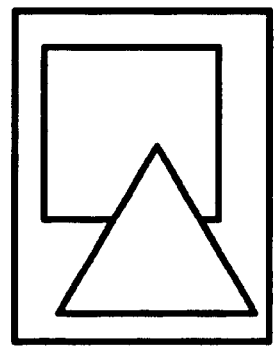
Fig. 3D　　　　　Fig. 3E　　　　　Fig. 3F

| SMALL AREA | LAST OVERWRITING IMAGE |
|---|---|
| (0,0) | #4 |
| (BW,0) | #10 |
| (2BW,0) | #10 |
| ... | ... |
| (W-BW, H-BH) | #1 |

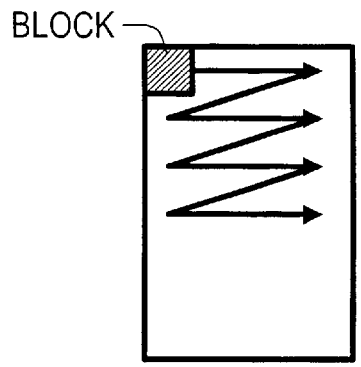
Fig. 10A
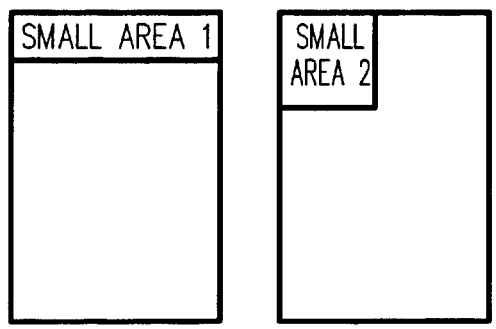
Fig. 10B
| BLOCK LINE | OFFSET FROM HEAD | CODE LENGTH |
|---|---|---|
| 1 | | |
| 2 | | |
| ... | | |
| N | | |
Fig. 10C

INPUT IMAGE 1

INPUT IMAGE 2

| SKIP 220 |
|---|
| SKIP 221 |
| INPUT 222 |
| SKIP 223 |
| CODE AND STORE 222 |
| INPUT 220 |
| SKIP 221 |
| SKIP 222 |
| OVERWRITE 220 WITH 223 |
| CODE AND STORE 220 + 223 |
| SKIP 220 |
| INPUT 221 |
| SKIP 222 |
| SKIP 223 |
| CODE AND STORE 221 |
| DECODE AND STORE 222 |
| DECODE AND STORE 220 + 223 |
| DECODE AND OUTPUT 221 |

Fig. 19A
(PRIOR ART)

| CODE AND STORE 220 |
|---|
| CODE AND STORE 221 |
| CODE AND STORE 222 |
| DECODE 220 |
| OVERWRITE 220 WITH 223 |
| CODE AND STORE 220 + 223 |
| DECODE AND OUTPUT 222 |
| DECODE AND OUTPUT 220 + 223 |
| DECODE AND OUTPUT 221 |

Fig. 19B
(PRIOR ART)

IMAGE PROCESSING APPARATUS AND METHOD

BACKGROUND OF THE INVENTION

1. Field of the Invention

The present invention relates to a technique for image processing, and more particularly to an apparatus and methods for overwriting image data at low cost and high speed.

2. Discussion of the Related Art

Overwriting of images is the process of overwriting an image with another image of a predetermined unit. It includes, for example, overwriting with non-transparent ink by PS(Post Script,"PostScript Reference Manual, Second Edition" Adobe Systems, Ascii), a type of PDL(Page Description Language). A"predetermined unit" may be a single raster or a plotting object.

Although usual image processing, such as enlargement, reduction and spatial filtering("Image Analysis Handbook" Tokyo University Press), can be performed in one direction from the left upper side of an image to the right bottom side, overwriting cannot be performed in one direction with respect to the space coordinates of an image.

In an overwriting process, the overwriting image may be input randomly with respect to the space coordinates of the output image. Therefore, if the process is performed in the input order, it cannot be performed in the order of the space coordinates on the output image side. FIGS. 13(a) and 13(b) show an example of overwriting, wherein 210 and 211 are plotting objects. FIG. 13(b) is the output result of overwriting 210 with 211. It can be understood from the drawings that a random scan needs to be performed on the output image, and that a page memory is necessary in an overwriting process.

Overwriting is performed by manipulating a data under process. When expressed as a data flow, it can be seen that a feedback loop appears during the process. Feedback loops cause overheads in the processing time that leads to controlling complications, and therefore are generally preferred to be shorter.

Smaller page memories are also preferred. With the high resolution of image data in recent high image quality printing apparatuses, reducing of memories remains a crucial problem despite the decrease in the unit price of memories. The following are examples of methods suggested hereto to reduce page memories.

The first method is disclosed by Japanese Laid-Open Patent Application No.5-31974. This method aims to reduce the required memory volume by applying image compression coding when storing overwritten image data to a page memory.

FIG. 14 is a block diagram illustrating this method. The block diagram is modified to best illustrate this method in relation to the present invention, within limits not prejudiciary to the disclosure.

As shown in FIG. 14, an input image data 110 is input to an image input unit 10. An overwriting unit 20 overwrites the input image data 110 over a stored image data 140 with predetermined small areas as processing units, and outputs the result to a small area buffer 30 as a processed image data 120. The small area buffer 30 outputs the processed image data 120 to an output switching unit 40 as a processed image data 130. The output switching unit 40 outputs the processed image data 130 to the coder 50 as an output image data 150 if the overwriting is complete, and if not, to the overwriting unit 20 as the stored image data 140. The coder 50 performs a predetermined compression coding upon the output image data 150 and outputs the result to a compressed page memory 60 as a code data 160. The compressed page memory 60 stores the code data 160 until code data correspondent to all of the small areas are complete, and then outputs them to a decoder 70 as a code data 170. The decoder 70 transforms such decoding that is the reverse transform of the coding performed by the coder, and outputs the result as a decoded image data 180 to an image output unit 80. The image output unit 80 outputs the decoded image data 180 to an external device.

FIG. 15 is a flow chart showing the operations of this method. In this method, image data are divided into partial image data. Each partial image data is referred to as a small area. The image data currently under processing is called a target image data and the small area currently under processing is similarly called a target small area.

As shown in FIG. 15, the input image data 110 is input in the image data input unit 10 in step 10. In step 20, the input image data 110 is handled in small area units and the process proceeds to step 30 if the area currently being input is correspondent to the target small area, or to step 50 if it is not. In step 30, the target small area stored in the target small area 30 is read out as the stored image data 140 through the output switching unit. In step 40, the overwriting unit 20 overwrites the input image data 110 over the stored image data 140. In step 50, the small area is skipped because the input image data 110 does not correspond to the target small area. In step 60, it is determined if processing is complete for all of the small areas of the target image data. The process proceeds to step 70 if all are complete, and returns to step 20 otherwise.

In step 70, it is determined if processing is complete for all of the input image data. If all are complete, the process proceeds to step 80, and to step 90 if not. In step 80, the coder 50 codes the output image data 150 the overwriting of which is complete, and stores the coded data in the compressed page memory 60. In step 90, the next image data becomes the target image data. In step 100, it is determined if overwriting is complete for all of the small areas. The process proceeds to step 110 if it is, and to step 120 if not. In step 110, the decoder 70 decodes the coded data 170 and outputs the result to the image output unit 80. In step 120, the next is small area becomes the target small area, and the first image data of the input image data 110 becomes the target image data.

The coder 50 and the decoder 70 performs such image data compression coding that renders the resulting data quantity of the code data 160 smaller than that of the processed image data 150. In the disclosure of this method, compression using DCT(Discrete Cosine Transform) is discussed as an example.

According to this method, the overwritten image data is complete is stored in a coded state. Therefore, reduction of required memory is possible since storage capacity enough to store the code quantity of a page worth of image data is only needed. The memory aimed to store a page worth of image data in a compressed state is referred to as a compressed page memory hereinafter.

This method performs the coding process in the pixel order of the output image. Therefore, it is necessary to repeatedly input the input image in accordance with the output image. The resulting increase in the processing time is a problem with this method.

The second method explained hereafter has been suggested in order to solve this problem and is disclosed by Japanese Laid-Open Patent No. 5-37789. According to this method, image compression coding is performed to image data under an overwriting process and the result is stored in a page memory. This way, the necessary memory capacity is reduced and image data needs to be input only once as well.

FIG. 16 is a block diagram illustrating this method. The parts similar to those of the first method have the same numberings and perform the same functions as in FIG. 4, and therefore are not repeatedly discussed in detail. 141 is a stored image data and 181 is a decoded image data.

FIG. 17 is a flow chart showing the operations of this method. Here again, the operations similar to those of the first method have the same numberings and perform the same functions, and therefore are not repeatedly discussed in detail.

As shown in FIG. 17, a decoder 70 decodes a code data 170 of a target small area stored in a compressed page memory 60 in step 31, and the resulting data is stored in an overwriting unit 20 as a stored image data 141 through an output switching unit 40. In step 81, a coder 50 codes a processed image data 130 regardless of whether or not overwriting of the target small area is complete.

As in the first method, this method aims to reduce the required memory using a compressed page memory. In addition, this method eliminates the need to repeatedly input image data by storing in the compressed page memory small area image data under processing in addition to those the overwriting of which is complete.

However, since this method codes all of the small areas of an image data including those under processing, the heavy processing load of the coding process incurs an overhead in the processing time. Furthermore, if image data is coded by lossy coding, the same image data is repeatedly coded and causes an accumulation of errors called a generation noise, which results in a deterioration of image quality.

FIGS. 19(a) and 19(b) respectively show examples of an overwriting process sequence in the first and second methods of the prior art apparatuses when overwriting input image 1 of FIG. 18(a) with input image 2 of FIG. 18(b).

As shown in FIG. 19(a), in the first method, in order to process small area 222, small areas 220, 221 and 223 are skipped and are not read. Similar skips occur when processing other small areas, resulting in a large image input overhead. As shown in FIG. 19(b), in the second method, it is necessary to decode small area 220 before overwriting it with small area 223. This corresponds to the feedback loop of the stored image data 141 in FIG. 16, and is prolonged because of the decoding process, thereby increasing the process time. Also, as mentioned earlier, the problem of image quality deterioration remains if lossy coding is performed.

SUMMARY OF THE INVENTION

The present invention has been made in view of the above circumstances and with an aspect to provide an image data processing technique that overwrites image data at low cost and high speed.

An image processing apparatus according to the first aspect of the present invention includes an overwriting unit that overwrites a partial image data of an image data, a partial image data storing unit that stores the output partial image data from the overwriting unit, and a process prediction unit that predicts whether further overwriting is performed upon the partial image data.

The image processing apparatus further includes a completion judgment unit that sends the partial image data to a coding unit if the overwriting processing is complete, and to a data storing unit otherwise, the coding unit performing a predetermined image data compression coding upon the partial image data, a data storing unit that stores either the partial image data output from the completion judgment unit or the code data output from the coding unit and an output switching unit that sends the data stored in the data storing unit to the overwriting processing unit if it is a partial image data, and to a decoding unit if it is a code data, the decoding unit decoding the code data by an inverse process of the coding.

With this construction, an overhead incurred during the inputting of images can be reduced since the input image data do not need to be repeatedly input. Furthermore, the process load of the feedback loop of overwriting process can also be reduced because partial data that are predicted as having a further overwriting process is stored in the data storing unit without being coded. The partial data the overwriting of which is predicted as being complete is coded and stored in the data storing unit, and therefore the memory volume of the data storing unit can be reduced, thus reducing the cost.

The prediction of the presence of further overwriting may be accurate or inaccurate. When the prediction is inaccurate and a wrong prediction is made, a penalty is accordingly generated. However, the effectiveness of the image processing increases as a whole if the prediction is accurate. If there is a chance that overwriting of a partial image is predicted as being complete when it is not, such construction that further performs a more accurate prediction when it is predicted that overwriting is complete may be included. The process load increases to an extent in this case, but penalties caused by inaccurate predictions can be avoided.

In another embodiment of the present invention, an image processing apparatus includes an overwriting unit that overwrites a partial image data of an image data, a partial image data storing unit that stores the output partial image data from the overwriting unit, a process prediction unit that predicts whether further overwriting is performed upon the partial image data and a completion judgment unit that sends the partial image data to a coding unit if the overwriting processing is complete, and to a data storing unit otherwise, the coding unit performing a predetermined image data compression coding upon the partial image data.

The image processing apparatus further includes a data storing unit that stores either the partial image data output from the completion judgment unit or the code data output from the coding unit, an output switching unit that sends the data stored in the data storing unit to the overwriting processing unit if it is a partial image data, and to a code data converting unit if it is a code data, the code data converting unit converting the code data so as to further reduce its code quantity and a code data output unit that outputs the resulting code data from the code data converting unit.

With this construction as well, both an overhead incurred during the inputting of images and the process load of the feedback loop of overwriting process can be reduced, and the memory volume of the data storing unit can be reduced.

In yet another embodiment of the present invention, an image processing apparatus includes an overwriting unit that overwrites a partial image data of an image data, a partial image data storing unit that stores the output partial image data from the overwriting unit and a first data storing unit that stores the partial image data.

The image processing apparatus further includes a coding unit that performs a predetermined image data compression coding upon the partial image, a second data storing unit that stores the code data, and a decoding unit that decodes the code data by inverse process of the coding.

With the above construction, the throughput of image processing is improved since partial data can be coded regardless of whether overwriting is complete or not. If further overwriting must be performed on a partial data, non-coded image data stored in the first data storing unit is used. In this way, unnecessary coding and decoding processes can be eliminated from the feedback loop of the overwriting process, and process load is reduced as a result.

In another embodiment of the present invention, an image processing apparatus includes an overwriting unit that overwrites a partial image data of an image data, a partial image data storing unit that stores the output partial image data from the overwriting unit, a first data storing unit that stores the partial image data and a coding unit that performs a predetermined image data compression coding upon the partial image.

The image processing apparatus further includes a second data storing unit that stores the code data, a code data converting unit that converts the code data so as to further reduce its code quantity and a code data output unit that outputs the code data.

With this construction as well, the throughput of image processing is improved, and unnecessary coding and decoding processes can be eliminated from the feedback loop of the overwriting process.

An aspect of the present invention is that the partial image is coded as an individual image data, and a part of the partial image data is stored without being coded. The part of the partial image data that is stored without being coded is a direct current component of a head block and an end block of the partial image data.

Another aspect of the present invention is that the partial image is coded based upon a code data order as an individual image data that consists of a plurality of independent code data. The plurality of independent code data are independent in block line units.

Yet another aspect of the present invention is that the image processing apparatus performs a code data conversion by connecting the code data of each partial data to reduce the code quantity. The code data of each partial data is connected by determining and coding the difference of direct current component values of adjacent code data. A control signal that initializes the coding or the decoding is added between the code data of each partial data.

An another aspect of the present invention is that the process prediction process inspects which input image data overwrites which predetermined partial data. The process prediction is performed prior to the overwriting process. The process prediction is performed in parallel with the overwriting process of an image data the process prediction of which was performed immediately before.

BRIEF DESCRIPTION OF THE DRAWINGS

The accompanying drawings, which are incorporated in and constitute a part of this specification, illustrate embodiments of the present invention and, together with the description, serve to explain the aspects, advantages and principles of the invention. In the drawings:

FIGS. 3(a)–3(f) illustrate a process prediction of the image processing apparatus of the first embodiment of the present invention;

FIGS. 10(a)–10(d) show a scanning order of the image processing apparatus of the second embodiment of the present invention;

FIGS. 12(a) and 12(b) are exemplary block diagrams illustrating the construction of the third embodiment. In FIGS. 12(a) and 12(b), the parts similar to those in FIG. 1 or FIG. 8 perform the same functions and have the same reference numbers and therefore are not discussed here in detail. The operations that are easily analogized from the first and the second embodiments are also not discussed in detail here.

FIGS. 19(a) and 19(b) show process sequences of the first and second examples of the prior apparatuses in an overwriting process.

DETAILED DESCRIPTION OF THE PREFERRED EMBODIMENTS

The problems of the first and second examples of the prior art are mainly caused by the way feedback loops are handled. Now, the basic principles of the present invention are discussed in relation to the two examples of the prior art.

Figure 15:
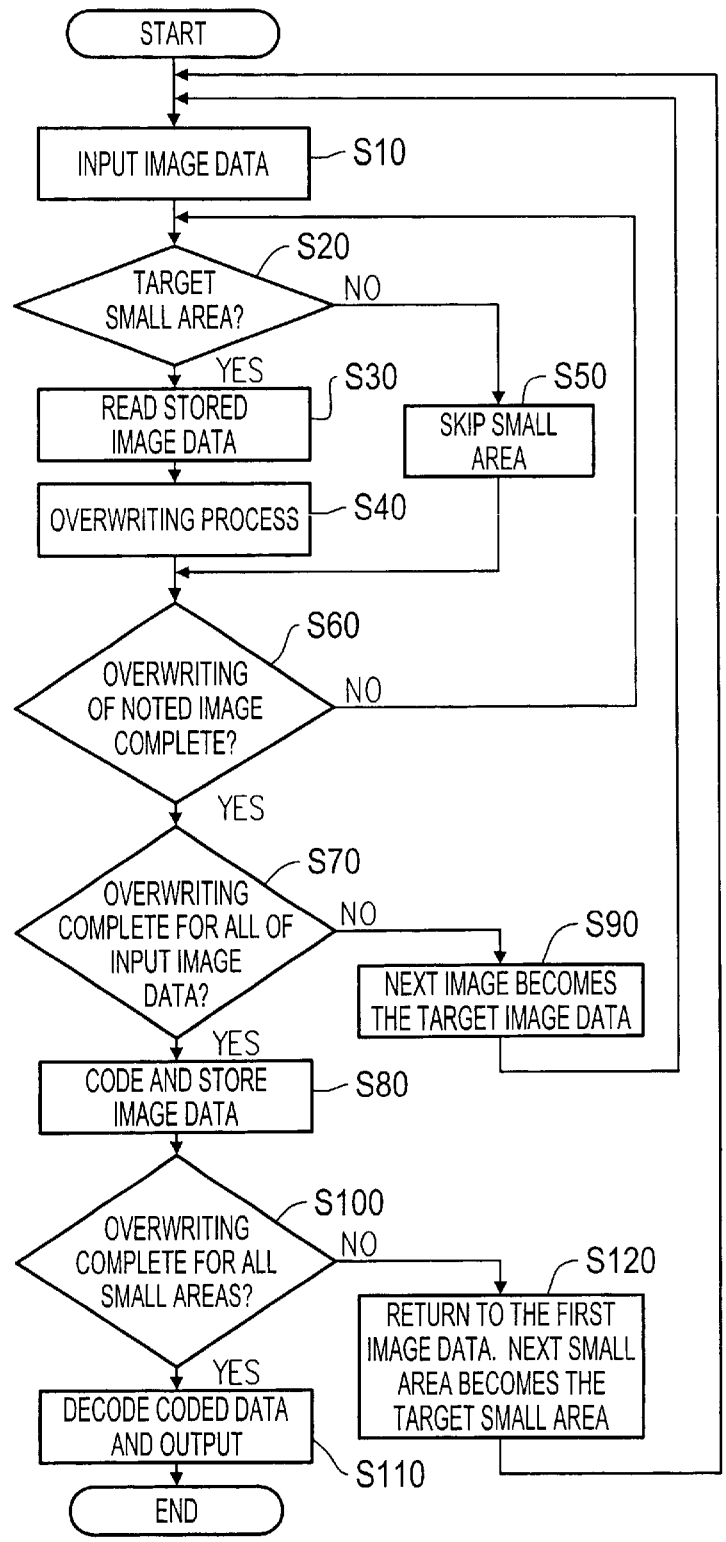
FIG. 15 is a flow chart showing an operation of the first example of the prior art apparatuses.

In the method of the first example of the prior art, the coding and decoding performed to realize a compressed page memory is eliminated from the feedback loop, and therefore a high speed processing is possible as far as target small areas are concerned. However, in order to realize this construction, a large feedback loop occurs as a part of the process sequence, as illustrated in FIG. 15. This feedback loop, created as a result of the transitions from one target small area to the next, requires the same image data to be repeatedly input and increases the processing time as a result.

In the method of the second example of the prior art, storing of small areas in a compressed page memory was included in the data flow of an overwriting process in order to avoid a feedback loop in the process sequence. The process sequence was simplified in this way, but the inclusion of unnecessary coding and decoding in a feedback loop prolonged the loop and resulted in an increase in the processing time.

In response to the above problems, the present invention does not code data that requires a feedback or predicted as so, but only such data that are output as they are. For that purpose, the present invention analyzes each small area and predicts the processing path that follows. As a result, data requiring feedback and small areas the overwriting of which is not complete are not coded, and data not requiring a feedback, namely small areas the overwriting of which is complete are coded and stored.

First Embodiment

Figure 1:
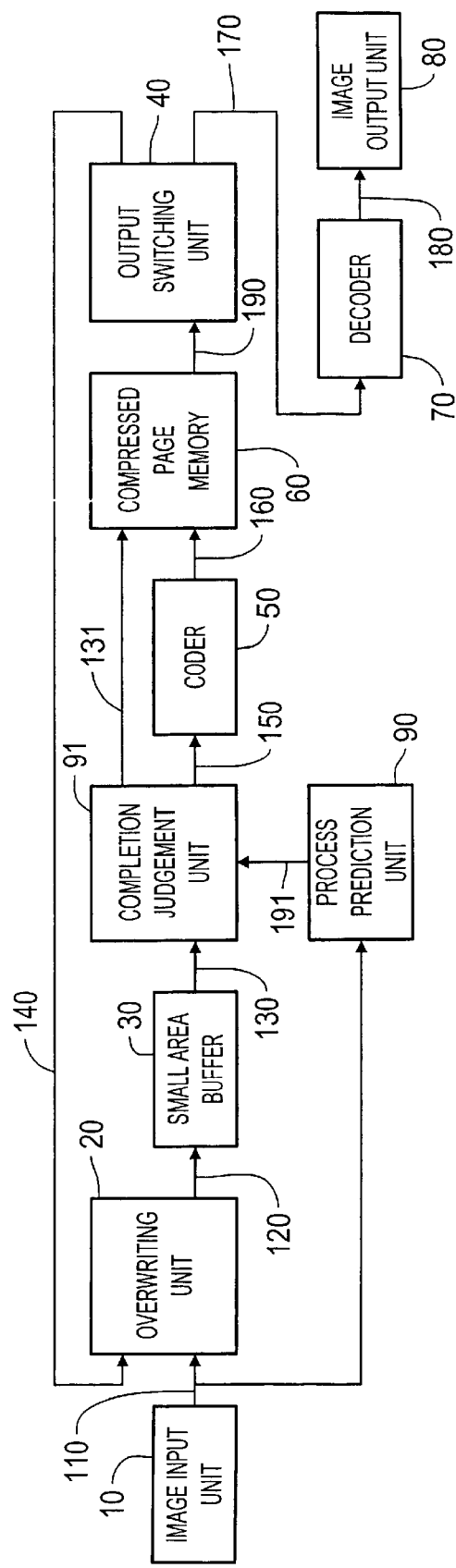
FIG. 1 is an exemplary block diagram illustrating the construction of a first embodiment of an image processing apparatus according to the present invention.
Figure 14:
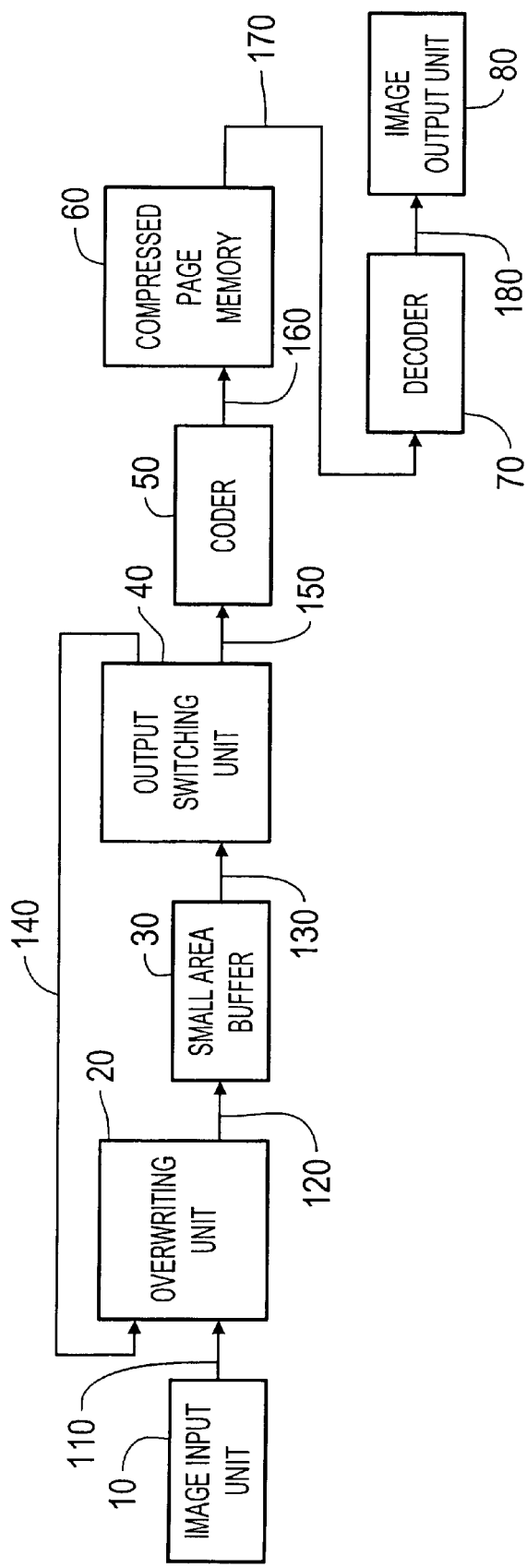
FIG. 14 is a block diagram illustrating the construction of an image processing apparatus according to the first example of the prior art apparatuses.
Figure 16:
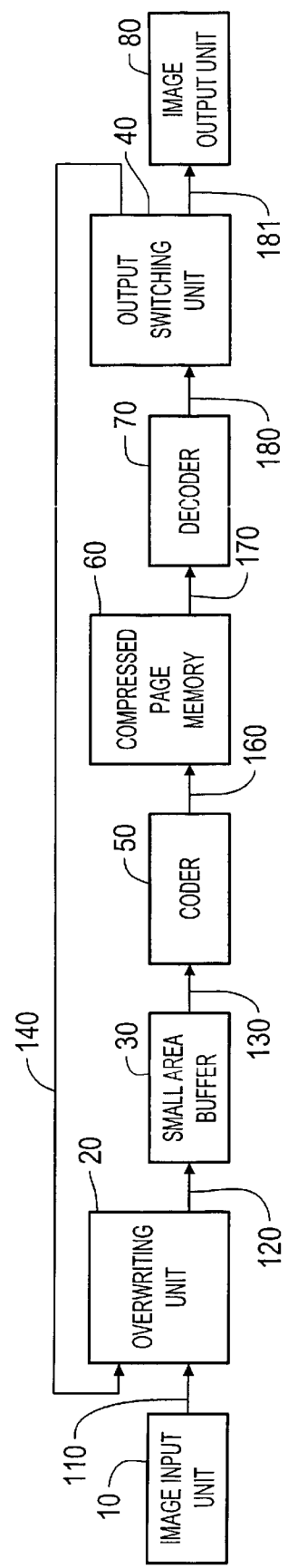
FIG. 16 is a block diagram illustrating the construction of an image processing apparatus according to the second example of the prior art apparatuses.

FIG. 1 is an exemplary block diagram illustrating the construction of the first embodiment. In FIG. 1, the parts similar to those in FIG. 14 or FIG. 16 perform the same function and have the same reference numbers and therefore are not discussed here in detail.

As shown in FIG. 1, a process prediction unit 90 predicts whether an overwriting performed upon a target small area is the final one. The prediction process is discussed in further detail later. Based upon the prediction result of the process prediction unit 90, a completion judgment unit 91 outputs data the overwriting of which is complete to a coder 50 as output image data 150, and data the overwriting of which is not complete to a compressed page memory 60 as processed image data 131.

Figure 2:
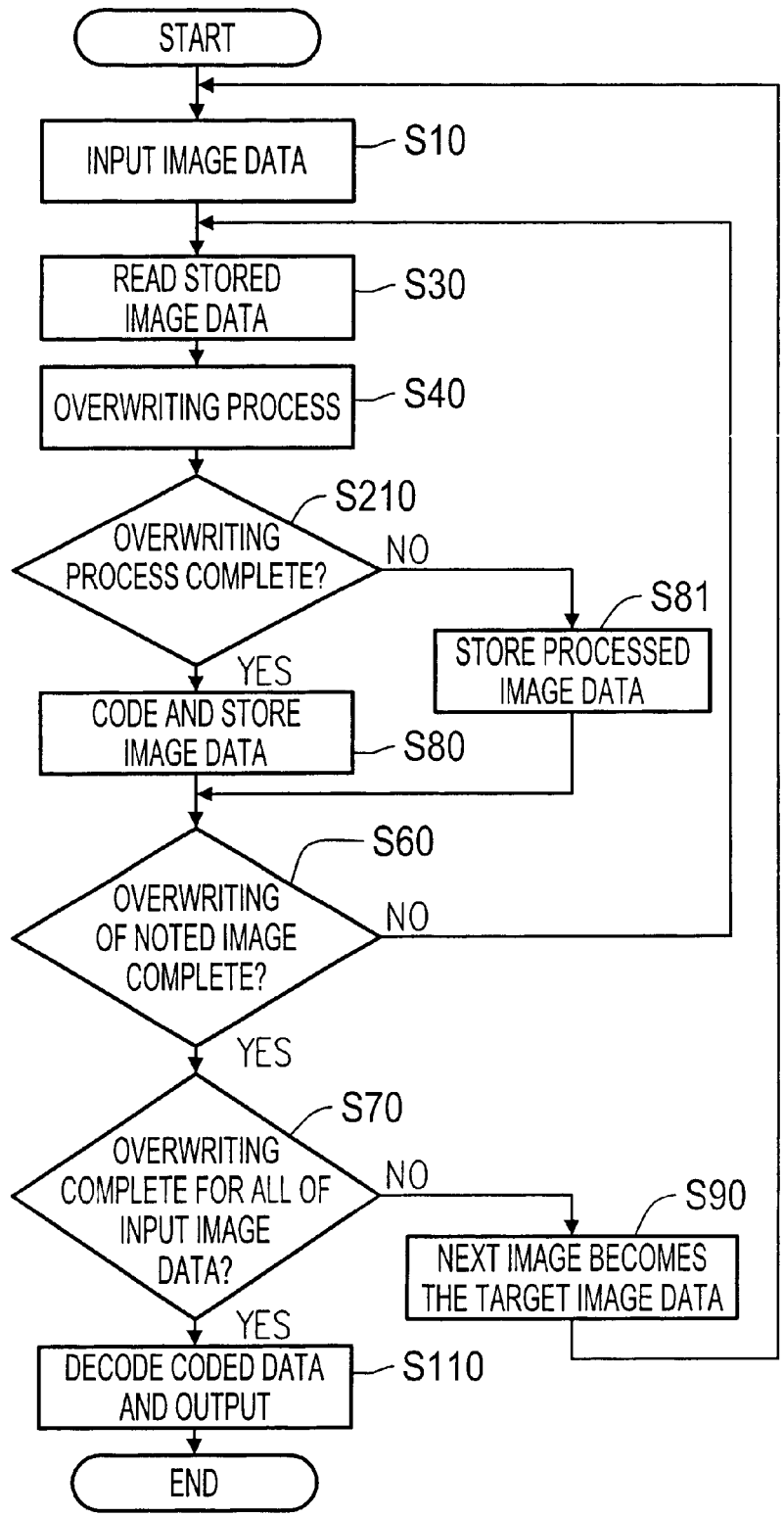
FIG. 2 is a flow chart showing an overwriting process of the image processing apparatus of the first embodiment of the present invention.
Figure 17:
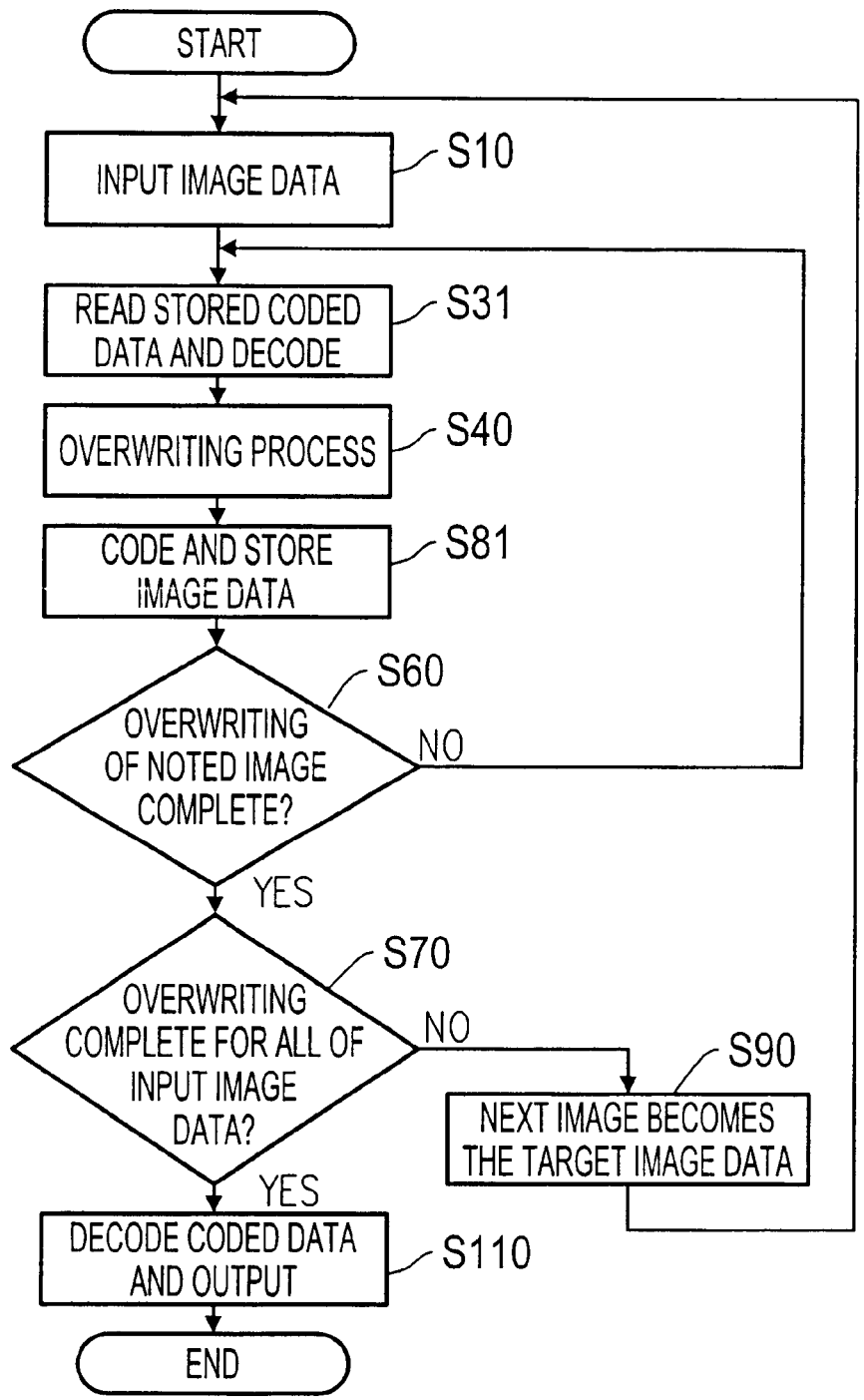
FIG. 17 is a flow chart showing an operation of the second example of the prior art apparatuses.
Figure 18A:
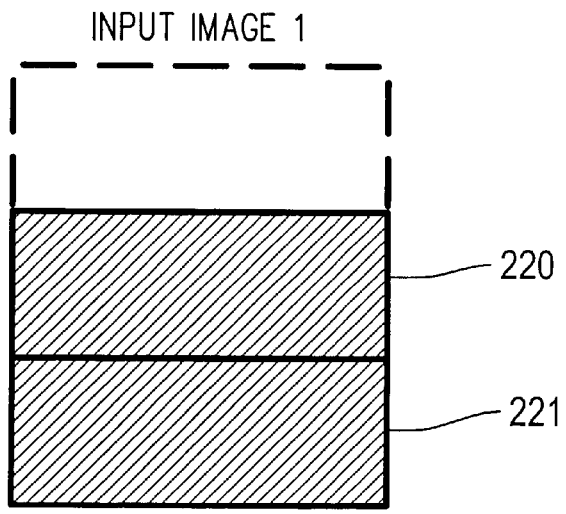
FIGS. 18(a) and 18(b) show examples of input image data to be overwritten by one another.
Figure 18B:
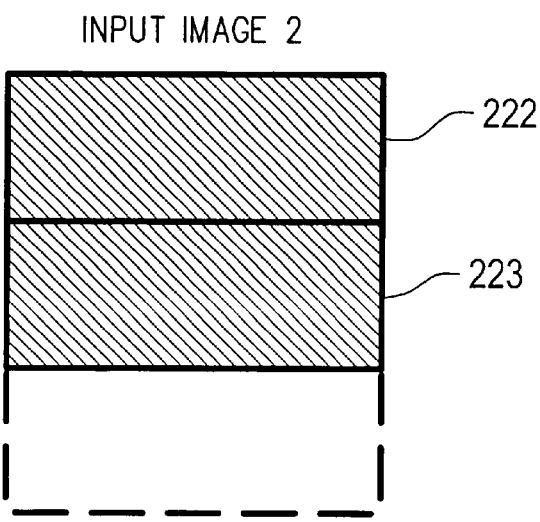

FIG. 2 is a flowchart showing the operations of the first embodiment. In FIG. 2, the steps similar to those in FIGS. 15 and 17 perform the same function and have the same reference numbers and therefore are not repetitively discussed here in detail.

As shown in FIG. 2, in step 210, if overwriting of a processed image data 130 is complete, the process proceeds to step 80, and to step 81 if not. In step 81, the processed image data 131 is stored in the compressed page memory 60 without coding.

Now, the operations of the process prediction unit 90 are discussed in detail. The process prediction unit 90 predicts the presence of remaining processing in each of the small areas by inspecting to which input image data a small area is related. The processing load is lighter than that of a regular PDL decompose process because pixel value information is unnecessary. Such processing as laying out of raster objects, in particular, can be performed at relatively high speed.

FIGS. 3(a)–3(f) illustrate the basic concept of process prediction. FIG. 3(a) is an example of the desired final output. In this case, a PDL decomposer holds such information as illustrated in FIGS. 3(b)–3(e). FIG. 3(b) is the pixel value information of the first input image, and FIG. 3(c) is information that represents the peripheral shape of the valid area of the first input image data. Such peripheral shape information is referred to as shape information hereinafter. FIGS. 3(d) and 3(e) respectively are the pixel value information and the shape information of the second input image. Generally with a PDL decomposer, FIG. 3(f), or an overwritten shape information, is first generated using FIGS. 3(c) and 3(e), and then the final output image FIG. 3(a) is generated using FIGS. 3(b) and 3(d). With the present invention, however, the latter process can be eliminated because only the result of the process prediction or such information as FIG. 3(f) is needed. The present invention is especially effective in such processing as laying out of raster objects in which the latter process is quite heavy.

As an example of process prediction, a processing upon an edge list, a form of PDL processing data, is now discussed. An edge list has as information units the identifiers of objects and the pixel number of objects consecutively aligned in the raster scan order, and expresses a whole image with an enumeration of the information units. Processing of a particular small area can be predicted by the existence of an edge between objects of the small area.

Figure 4A:
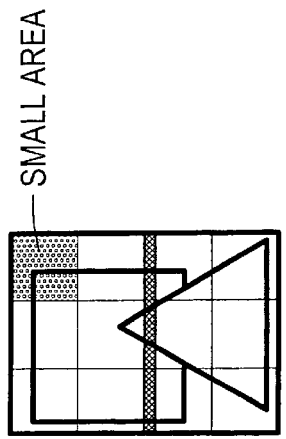
FIGS. 4(a) and 4(b) illustrate a process prediction of the image processing apparatus of the first embodiment of the present invention.
Figure 4B:
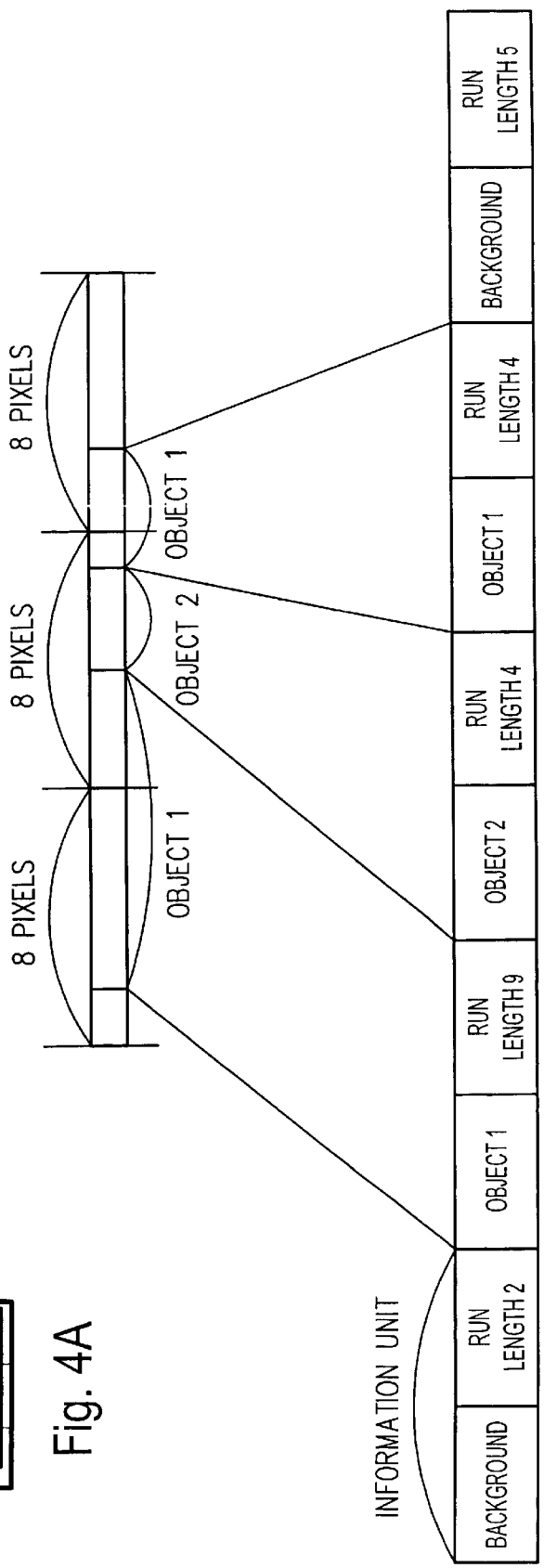

FIGS. 4(a) and 4(b) illustrate a process prediction of an edge list. The upper line illustrated in FIG. 4(b) focuses upon a particular line within the peripheral information shown in FIG. 4(a). The lower line illustrated in FIG. 4(b) expresses the line as an edge list. Suppose the width of the small area is 8 pixels. Among the three small areas included in the upper line of FIG. 4(b), it can be said that an overwriting process is performed only upon the middle small area, judging from the existence of edges between objects in the lower line of FIG. 4(b). Although edges exist in the other two small areas as well, they do not appear between objects and therefore do not meet the qualification for an overwriting to take place. Similar process prediction needs to be performed upon every line within the small areas.

Other methods of process prediction are also possible. For example, when small areas of an image data is a n×n pixel block, the presence of overwriting can be confirmed for each small area by plotting the image data with the resolution reduced to 1/n. In such a case, when a small area is overwritten with an image data of the exactly same size, it may be misjudged as having an overwriting process. However, such a misjudgment only has a small influence upon the whole process, and can be prevented by changing the processing accuracy of that particular area. In a decompose process where a two-dimensional information called a display list generally exists prior to an edge list, a process prediction similar to that of an edge list may be performed with less processing steps than that of a one-dimensional edge list.

The method as illustrated in FIGS. 4(a) and 4(b) is an example of process prediction without any misjudgments. There may also be variations that reduce the process load by purposely allowing for misjudgments. The above example of plotting image data with a reduced resolution is such an example. Other possible methods include performing process prediction locally only upon areas that are expected for an overwriting process to take place, or performing process prediction of complex shape information by simulating it with a simple shape. Prediction may also be performed by inspecting every other few lines of an edge list.

Among the possible misjudgments that occur while using the above methods, falsely predicting the presence of an overwriting process in a small area leaves processed image data 130 in the compressed page memory 60 after the overwriting process. Therefore, there arises a need to add a step to code such data after the overwriting process. On the other hand, when a small area that will be overwritten is mistakenly judged as being not, the small area is stored in the compressed page memory 60 as the code data 160. It is preferred that such misjudgments are prevented from occurring by controlling the direction of quantization and the like. For example, of the small areas judged as not being overwritten, the ones that are possibly misjudged by approximate errors may be detected and rejudged as being overwritten. When such a method is not possible, a local decoding process as discussed in the second example of the prior art is necessary. Such decoding, however, does not occur frequently and therefore there is not as much problem with processing time and image quality as in the second example of the prior art.

Figures 5A, 5B:
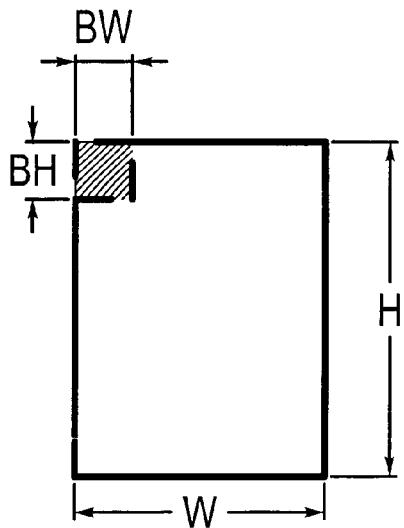
FIGS. 5(a) and 5(b) are an example of a data format of a result of a process prediction of the image processing apparatus of the first embodiment of the present invention.
Figure 6A:
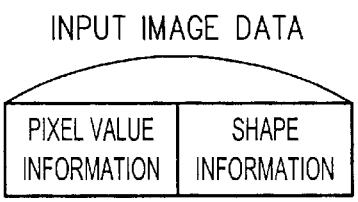
FIGS. 6(a)–6(d) show an example of a data format of an input image data of the image processing apparatus of the first embodiment of the present invention.
Figure 6B:
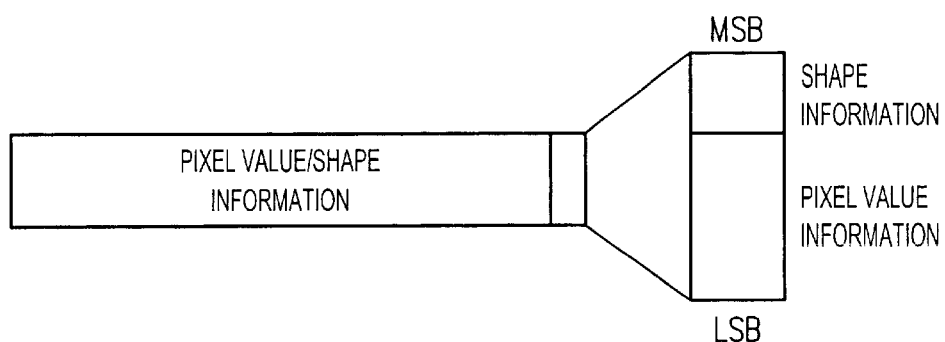
Figure 6C:
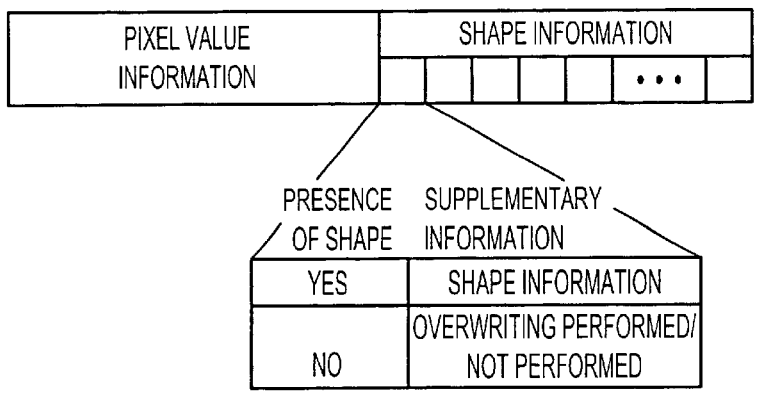
Figure 6D:
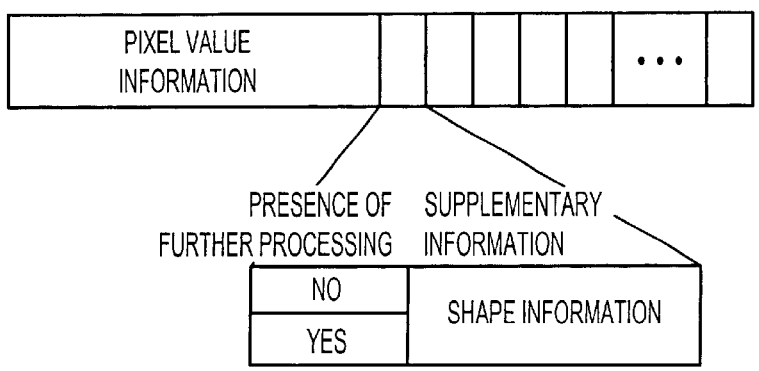

If a process prediction is performed beforehand or simultaneously with the overwriting of the image data of the prior page, and if information that tells which input image data is the last image to overwrite each small area is stored, the operation of the completion judgment unit 91 can be controlled real time. FIGS. 5(*a*) and 5(*b*) show an example of a data format as a result of a prediction process. As shown in FIG. 5(*b*), the identifiers(#1, #2, etc.) of the final overwriting image of each small area are stored.

A small area as discussed in the present invention signifies that it is a partial image data as opposed to a whole image. Therefore, the width of a small area does not necessarily equal the width of the image itself. The optimum size of a small area varies according to the size of the buffers in the apparatus or processing units. The present invention performs processing by small areas, so it is most effective when the small areas are small because then there are many small areas the overwriting of which is complete and that can be compressed.

The input image data 110 is a set of pixel value information and shape information so as to enable overwriting in arbitrary shapes. FIGS. 6(*a*) —6(*d*) show an example of a data format of the input image data 110. FIG. 6(*a*) is a most typical format in which the pixel value information and the shape information form one data stream. The order of the two kinds of information is not relevant. FIG. 6(*b*) is a case in which each pixel has a pixel value information and a shape information. Here, shape information shows whether overwriting will be performed. FIG. 6(*c*) divides shape information into small area units. If all or none of the pixels of a small area are overwritten, the shape information of each pixels is united into one shape information that shows whether the small area is overwritten or not. This eliminates the need for redundant shape information. The data order may also be such that pixel value information and shape information of each small area is a set. FIG. 6(*d*) is a format that shows in the image input unit 10, whether further overwriting processes exist after the image currently being processed for each small area. FIG. 6(*d*) is similar to FIG. 6(*a*) except for the inclusion of this information in the shape information. In this case, it is possible to simplify the process prediction unit 90 shown in FIG. 1 since the process prediction data 191 can be generated directly from the input image data 110.

Coding performed in the present invention may be either lossy or lossless coding. In the first embodiment, all of the small areas of an image are coded only once, and therefore no generation noise is occurred when applying lossy coding. The baseline system of JPEG, an international standard of multi-value image compression coding ("JPEG—An International Standard of Color Static Image Coding" Endo, Interface, Dec. 1991), for example, is a typical example of lossy coding. (The baseline system of JPEG is simply referred to as JPEG hereinafter.)

JPEG and other common image coding techniques handle image data as a series of consecutive information and hence it is difficult to separate data after coding. In this embodiment, however, since each small area is handled differently according to whether processing is complete, each small area is coded as independent image data.

In order to confirm the effect of the present embodiment, the theoretical processing time is compared with those of the methods of the prior art. Here, the number of small areas in one image data and the total number of small areas in all of the input images are referred to as variables S and A, respectively. $S \leq A$ always holds since overwriting is performed upon A number of input small areas to output S number of small areas. Processing time of overwriting and coding-decoding are expressed as $T_o$ and $T_c$, respectively. The relationship between $T_o$ and $T_c$ can generally be expressed as $T_o < T_c$, since the processing load of an overwriting process is light and synchronization is easily performed.

In the first example of the prior art, the overwriting time of image data is $S=A=T_o$, and the coding time is $S \times T_c$. The processing time is $\max(S \times A \times T_o, S \times T_c)$ when performing overwriting and coding processes in parallel. In the second example of the prior art, the coding time need not be considered, and the overwriting time is $\max(A \times T_o, A \times T_c)$ since decoding may be a bottleneck. On the contrary, in the present invention, parallel operation of overwriting and coding is performed and the slower of the two becomes a bottleneck, hence the overwriting time is $\max(A \times T_o, S \times T_c)$.

Figure 7:
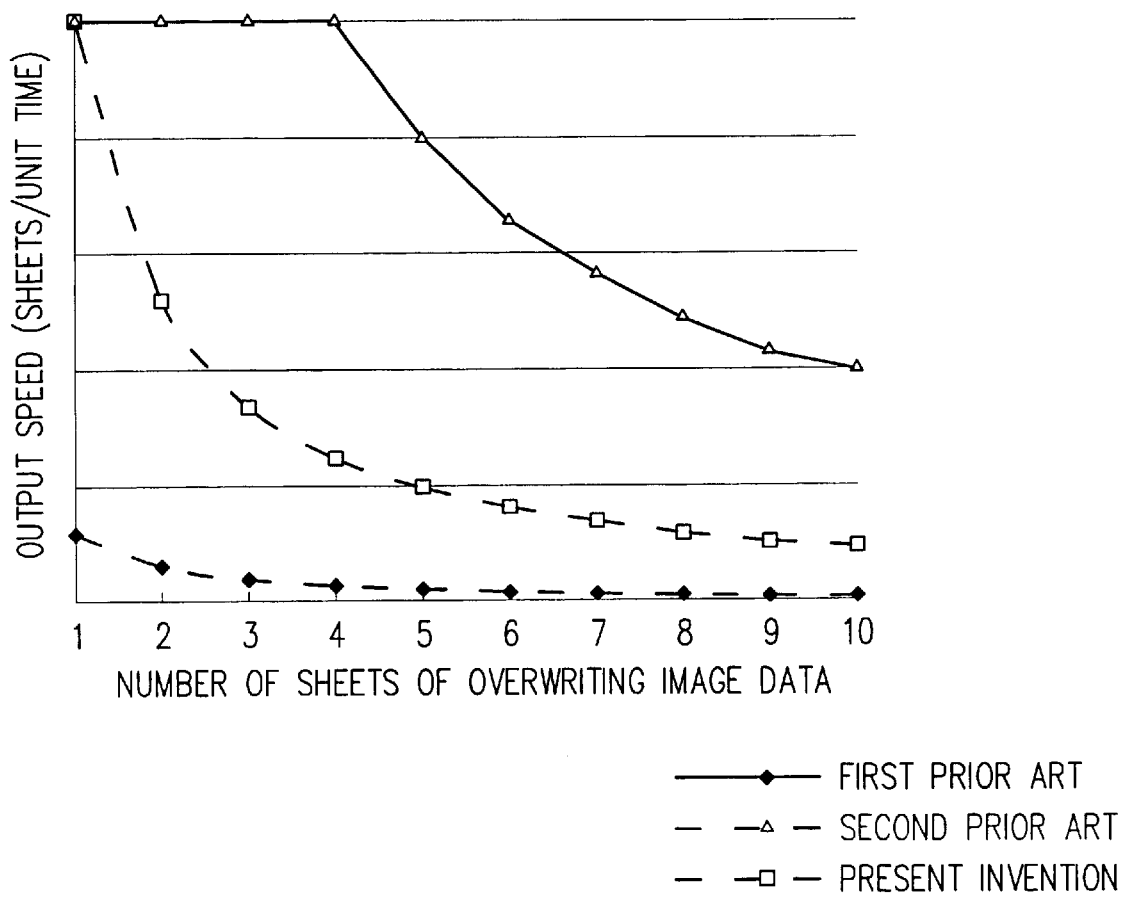
FIG. 7 shows an effect of the image processing apparatus of the first embodiment of the present invention.

FIG. 7 is a graph comparing the processing time of the present invention with those of the first and second methods of the prior art. As shown in FIG. 7, the abscissa represents the number of sheets of overwriting input image data. This graph is under the supposition that S=35, meaning that an image data of 35 million pixels is divided into 1 MB small areas, and that $4T_o = T_c$, meaning that overwriting can be simultaneously performed upon a block of 4 pixels. The ordinate shows the number of processed sheets per unit time. The bigger the number, the faster the processing, and hence the effectiveness of the present invention is apparent from this graph.

According to the method of the first embodiment, the processing time can be reduced because such unnecessary processing as coding and decoding are eliminated from the feedback loop created by the overwriting process. The necessary memory volume is also reduced since image data the overwriting of which is complete is coded and stored in the compressed page memory. In addition, deterioration of image quality is not so apparent even when applying lossy coding with high compression efficiency, since coding is only performed once.

Second Embodiment

The second embodiment of the present invention is an image processing apparatus that does not include a decoding process. Image compression coding, aside from temporary storage purposes as in the first embodiment, is also used for communication or long-time storage purposes such as a database. Assuming for such purposes, the second embodiment outputs compressed coded data without decoding them.

As in the first embodiment, the results of coding each small area as individual image data are stored in the compressed page memory 60 in FIG. 1. The resulting code quantity is small enough for temporary storage purposes as in the first embodiment, but for the above-discussed purposes of the second embodiment, reducing of code quantity becomes an important factor. In order to reduce the code quantity, it is generally preferred to handle image data as consecutive information, as in the coding of the difference in direct current components between blocks in JPEG. It is also easier to handle code data of a plurality of small areas as a block.

Figure 8:
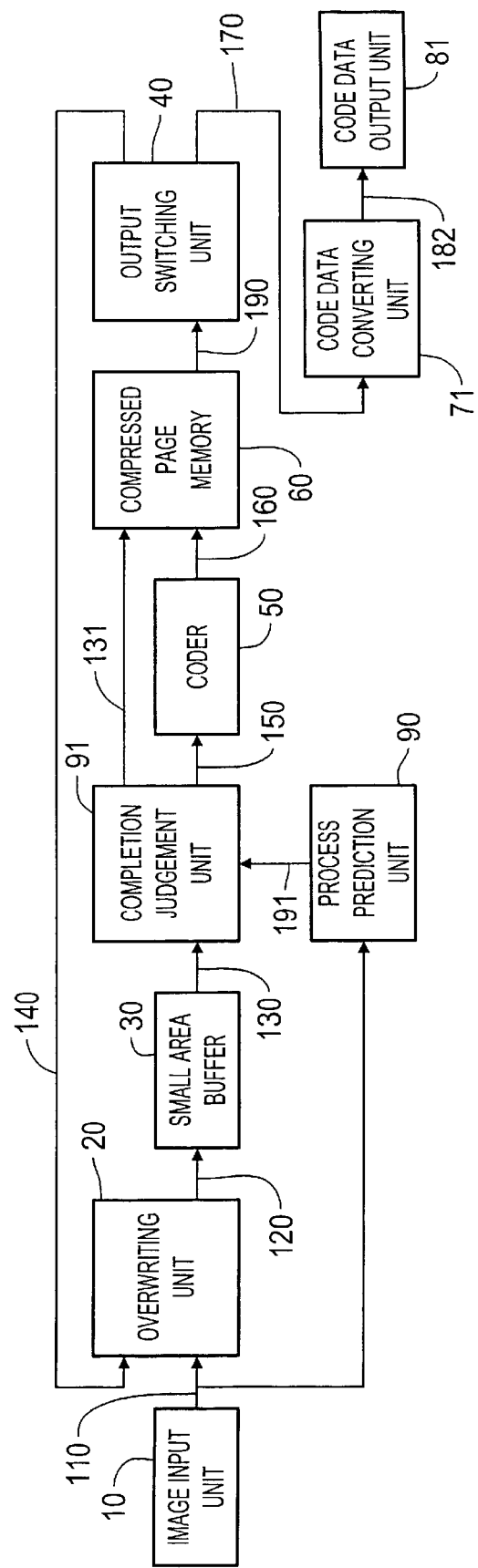
FIG. 8 is an exemplary block diagram illustrating the construction of a second embodiment of an image processing apparatus according to the present invention.

In view of the above, in this embodiment, the stored coded data are converted into consecutive code data before they are output. FIG. 8 is an exemplary block diagram illustrating the construction of the second embodiment. In FIG. 8, the parts similar to those in FIG. 1 perform the same functions and have the same reference numbers, and therefore are not discussed here in detail. The operations that are easily analogized from the first embodiment are also not discussed in detail here.

As shown in FIG. 8, a code data converting unit 71 performs a predetermined coding upon a code data 170, and outputs to a code data output unit 81 as an output code data 182. The code data output unit 81 outputs the output code data 182.

Figure 9A:
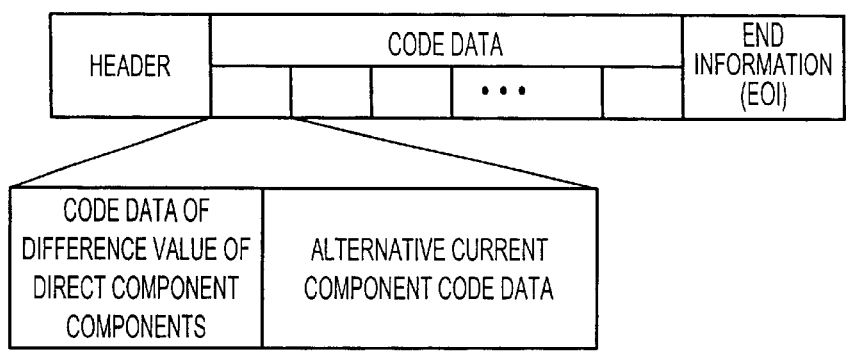
FIGS. 9(a)–9(d) show a code converting process of the image processing apparatus of the second embodiment of the present invention.
Figure 9B:
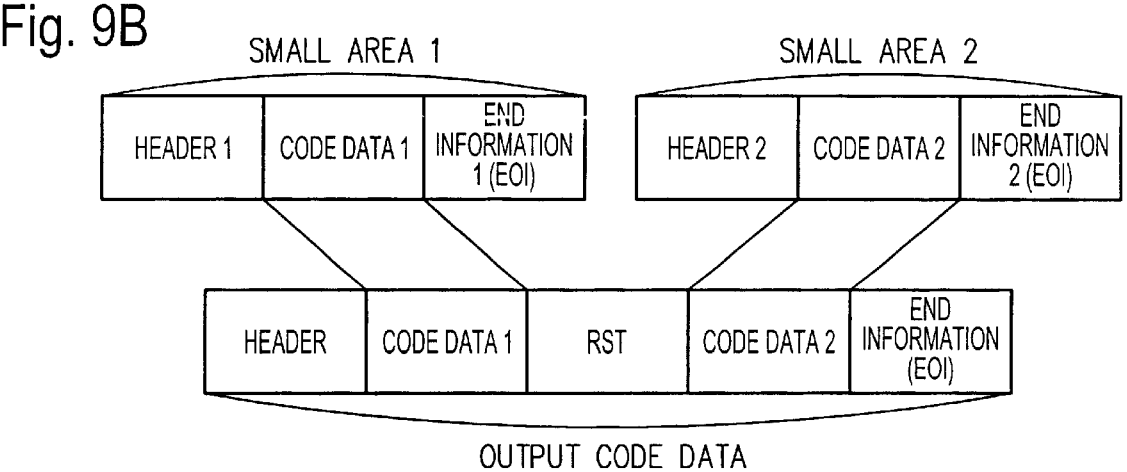
Figure 9C:
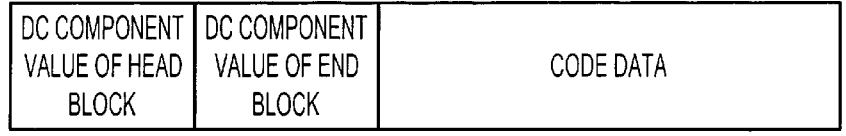

Here, the operations of the code data converting unit 170, illustrated in FIGS. 9(a)–9(d), is discussed. FIG. 9(a) shows a basic coding format of JPEG. A JPEG code data consists of a code data of the difference value of direct current components and a code data of the alternative current components. A header and an end information called EOI (End of Image) are allocated in the front and the rear. When code data 170 of each small area is in the format of FIG. 9(a), the output code data 182 may be constructed in a format as illustrated in FIG. 9(b), for example. In FIG. 9(b), RST (ReSTart) is a marker, or a control signal of JPEG that initializes the bit position of code data and the difference value of direct current components. By connecting the code data of each small area by RST, it is possible to decode separately generated code data as one image data. On the other hand, the format as illustrated in FIG. 9(c) is an example in which the code data 170 is constructed so that they can be easily connected. Here, the direct current component values of the head and end blocks included in the succeeding code data are not coded. When the code data 170 is in such a format, the output code data 182 in the format of FIG. 9(a) can be easily generated by calculating the before and behind difference values.

Figure 9D:
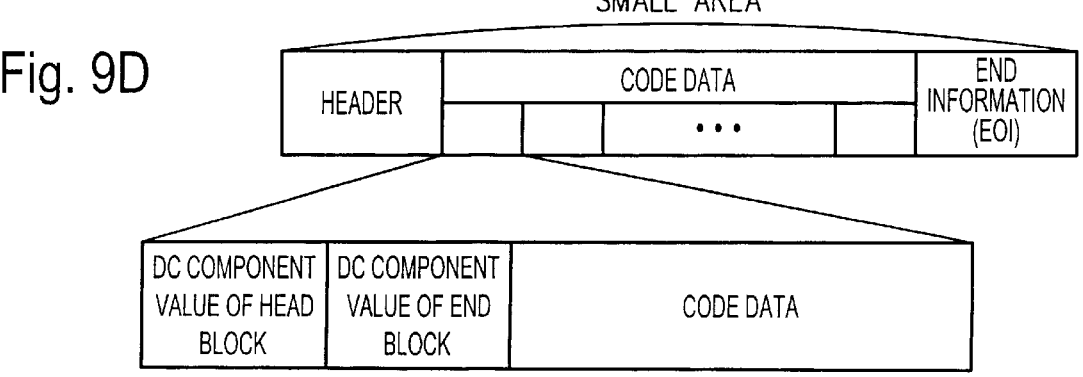

The above discussion is based on the supposition that the small areas are constructed in the same scan order as the image itself. Here, scan orders are discussed using FIGS. 10(a)–10(c). JPEG coding is performed in the scan order as illustrated in FIG. 10(a). When an image data is separated into small images as illustrated by small area 1 in FIG. 10(b), the small areas can be processed in the same scan order as the image. However, if an image data is separated in such a way as illustrated by small area 2 in FIG. 10(c), the scan order changes and code data 170 cannot be connected as they originally are. FIG. 9(d) is an example of a coding format in such a case. Code data of each block line are independent, and each code data is in the format as illustrated in FIG. 9(c). A block line is a laterally long, rectangular area, the height of which is the block size and the width of which is the width of the image. By constructing the block lines so that they are independent from each other, conversion of scan order is made easier. In such a case, such construction information as the head position of code data or the code length of each block line may be included in the header. An example of such side data is shown in FIG. 10(c).

Figure 11:
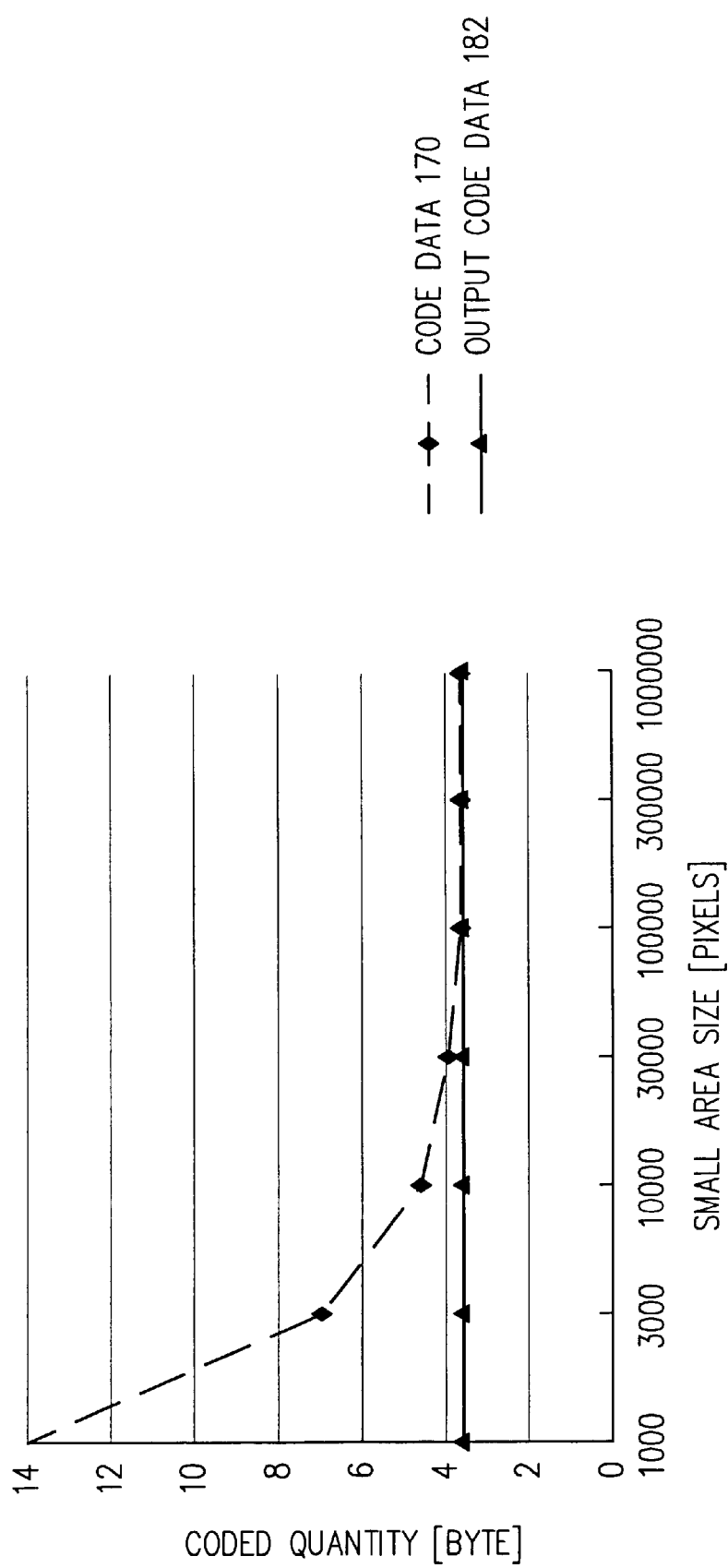
FIG. 11 shows an effect of the image processing apparatus of the second embodiment of the present invention.

Now, the code quantities of the code data 170 and the output code data 182 are compared in order to show the effectiveness of the second embodiment. Here, it is supposed that the format of the code data 170 is as illustrated in FIG. 9(a), and that there is an overhead of 300 bytes for each small area. It is also supposed that the compression rate when coding the whole image is 20, and the image size is 35 million pixels. FIG. 11 compares the code quantities of the code data 170 and the output code data 182 under these suppositions, and has as its abscissa the size of the small areas. As shown in FIG. 11, the present embodiment proves especially effective when the size of the small areas is small.

This embodiment may also be performed using image coding methods other than JPEG.

According to the second embodiment, the code quantity can be reduced since temporary stored code data are output after being converted into code data of a higher compression rate. Code data may also be output directly from the compressed page memory 60.

Third Embodiment

The third embodiment of the present invention is an image processing apparatus that does not include process prediction. Although the process load of process prediction is not heavy, a simpler construction may be preferred in the case of actual implementation.

Since process prediction is eliminated, overwriting may occur upon a coded image data. Processing speed and image quality becomes a problem when decoding such image data, as discussed in the second embodiment, so a means to store raw image data is included in order to render decoding unnecessary. In this case, there is an increase in the cost because a page memory is required.

FIG. 12 is an exemplary block diagram illustrating the construction of the third embodiment. In FIG. 12, the parts similar to those in FIG. 1 or FIG. 8 perform the same functions and have the same reference numbers and therefore are not discussed here in detail. The operations that are easily analogized from the first and the second embodiments are also not discussed in detail here.

Figure 12A:
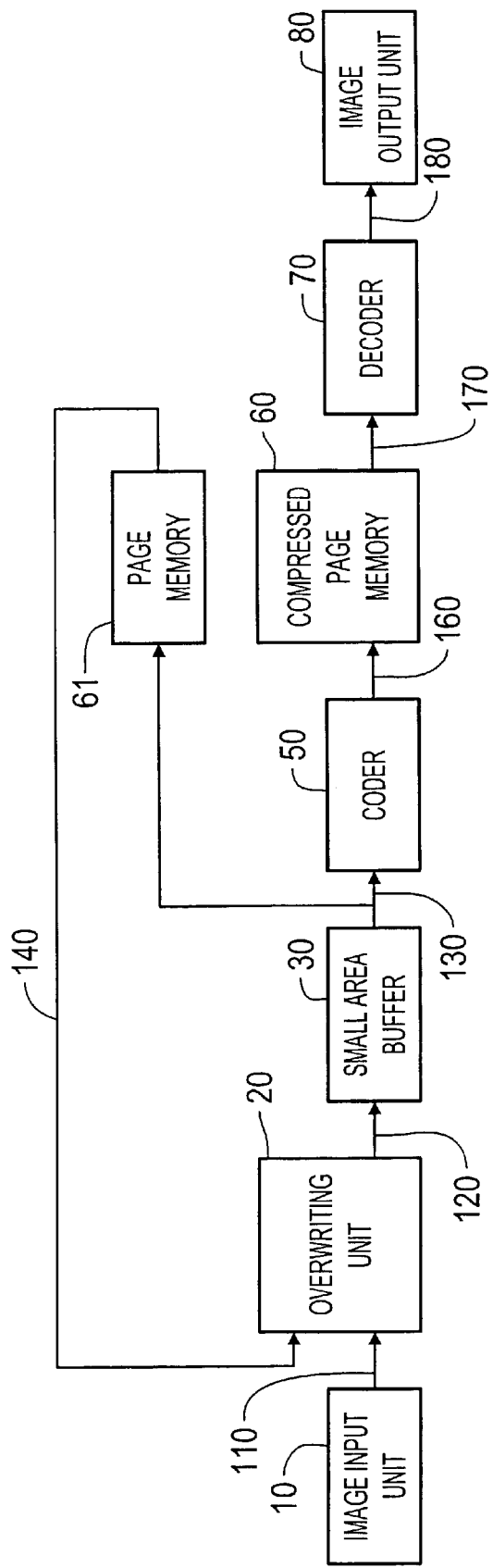
FIG. 12(a) is an exemplary block diagram illustrating the construction of a third embodiment of an image processing apparatus according to the present invention.

As shown in FIG. 12(a), a page memory 61 stores a processed image data 130 sent from a small area buffer 30, and outputs to an overwriting unit 20 as a stored image data 140.

Figure 12B:
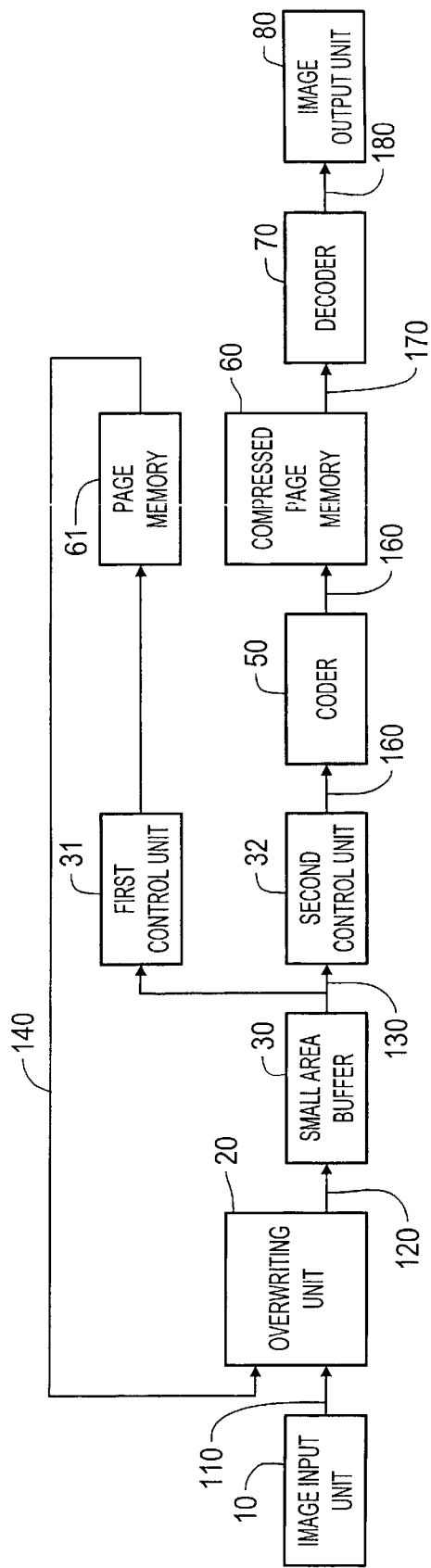
FIG. 12(b) is an exemplary block diagram illustrating first and second control units.
Figure 13A:
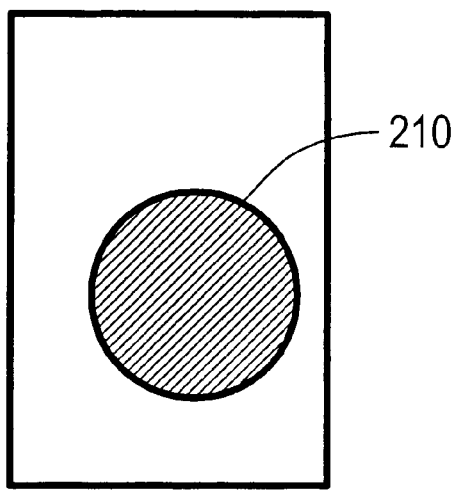
FIGS. 13(a) and 13(b) illustrate a concept of overwriting.
Figure 13B:
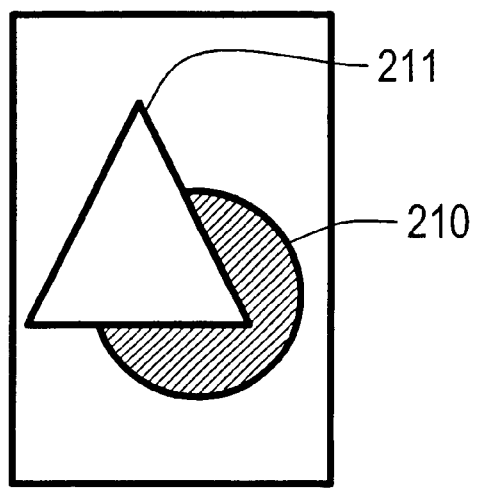

As shown in FIG. 12(b), an image input unit 10 inputs a partial image data 110, a first image data storing unit 61 stores a non-coded image data being overwritten 130, a second image data storing unit 60 stores a coded image data being overwritten, an overwriting processing unit 20 that partially overwrites the image data stored in the first image data storing unit 61 with the input partial image data 110, a first control unit 31 stores the non-coded overwritten image data 130 in the first image data storing unit 61, and a second control unit 32 stores the coded overwritten image data in the second image data storing unit 60.

The processed image data 130 of every small area are stored both in the page memory 61 and the compressed page memory 60. If further overwriting occurs upon the input image, the corresponding small area is read from the page memory 61. The data stored in the compressed page memory 60 is output when all overwriting processes are complete.

Therefore, all of the small areas are coded only once.

The cost of the third embodiment is higher than the first and second embodiments since there is a need for a page memory. However, the third embodiment is effective since it achieves the same high processing speed and image quality as the first and second embodiments.

Without the compressed page memory, the cost is about equal to the second example of the prior art without the coder 50 and the decoder 70. However, in the second example of the prior art, the page memory must be a double buffer in order to have an equal effect of a compressed page memory. Therefore either the processing time or the cost becomes twice that of the third embodiment, which can input the next page while the compressed page memory is outputting the data, According to this embodiment, a simple construction without a prediction process is realized by storing the image data both in a compressed and a non-compressed form.

In this embodiment, the decoder 70 or the image output unit 80 may be replaced by the code data converting unit 71 and the code data output unit 81 as illustrated in FIG. 8. Code data may also be output directly from the compressed page memory 60.

As shown in FIGS. 1, 8, 12(*a*) and 12(*b*), the method of this invention is preferably implemented on a programmed processor. However, the image processing apparatus can also be implemented on a general purpose or special purpose computer, a programmed microprocessor or micro controller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIGS. 2 can be used to implement the image processing functions of this invention. Furthermore, the elements of FIGS. 1, 8, 12(*a*) and 12(*b*) may be embodied in hardware, software or a combination of hardware and software.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. An image processing apparatus comprising:
    an overwriting unit that overwrites a partial image data of an image data;
    a partial image data storing unit that stores the output partial image data from the overwriting unit;
    a process prediction unit that predicts whether further overwriting is performed upon the partial image data;
    a completion judgment unit that sends the partial image data to a coding unit if the overwriting processing is complete, and to a data storing unit otherwise, the coding unit performing a predetermined image data compression coding upon the partial image data;
    a data storing unit that stores either the partial image data output from the completion judgment unit or the code data output from the coding unit; and
    an output switching unit that sends the data stored in the data storing unit to the overwriting processing unit if it is a partial image data, and to a decoding unit if it is a code data, the decoding unit decoding the code data by an inverse process of the coding.

2. The image processing apparatus as set forth in claim 1, wherein the partial image is coded as an individual image data, and a part of the partial image data is stored without being coded.

3. The image processing apparatus as set forth in claim 2, wherein the part of the partial image data is a direct current component of a head block and an end block of the partial image data.

4. The image processing apparatus as set forth in claim 1, wherein the partial image is coded based upon a code data order as an individual image data that consists of a plurality of independent code data.

5. The image processing apparatus as set forth in claim 4, wherein the plurality of independent code data are independent in block line units.

6. The image processing apparatus as set forth in claim 1, wherein the process prediction is performed by a simple image data generation.

7. The image processing apparatus as set forth in claim 1, wherein the process prediction is performed prior to the overwriting process.

8. The image processing apparatus as set forth in claim 1, wherein the process prediction is performed in parallel with the overwriting process of an image data the process prediction of which was performed immediately before.

9. An image processing apparatus comprising:
    an overwriting unit that overwrites a partial image data of an image and
    a partial image data storing unit that stores the output partial image data from the overwriting unit;
    a process prediction unit that predicts whether further overwriting is performed upon the partial image data;
    a completion judgment unit that sends the partial image data to a coding unit if the overwriting processing is complete, and to a data storing unit otherwise, the coding unit performing a predetermined image data compression coding upon the partial image data;
    a data storing unit that stores either the partial image data output from the completion judgment unit or the code data output from the coding unit;
    an output switching unit that sends the data stored in the data storing unit to the overwriting processing unit if it is a partial image data, and to a code data converting unit if it is a code data, the code data converting unit converting the code data so as to further reduce its code quantity; and
    a code data output unit that outputs the resulting code data from the code data converting unit.

10. The image processing apparatus as set forth in claim 9, wherein the code data conversion is performed by connecting the code data of each partial data.

11. The image processing apparatus as set forth in claim 10, wherein the code data of each partial data is connected by determining and coding a difference of direct current component values of adjacent code data.

12. The image processing apparatus as set forth in claim 10, wherein a control signal that initializes the coding or the decoding is added between the code data of each partial data.

13. An image processing apparatus comprising:
    an overwriting unit that overwrites a partial image data of an image data;
    a partial image data storing unit that stores output partial image data from the overwriting unit;
    a first data storing unit different from the partial image data storing unit that stores the output partial image data received from the partial image data storing unit;
    a coding unit that performs a predetermined image data compression coding upon the output partial image data to generate code data;

a second data storing unit that stores the code data; and a decoding unit that decodes the code data by an inverse process of the predetermined image data compression coding, wherein the overwriting unit reads the partial image data of the image data from the first data storing unit to overwrite the partial image data of the image data, and wherein the decoding unit decodes the code data when the overwriting unit completes the overwriting.

14. An image processing apparatus comprising:

an overwriting unit that overwrites a partial image data of an image data;

a partial image data storing unit that stores output partial image data from the overwriting unit;

a first data storing unit different from the partial image data storing unit that stores the output partial image data received from the partial image data storing unit;

a coding unit that performs a predetermined image data compression coding upon the output partial image data to generate code data;

a second data storing unit that stores the code data;

a code data converting unit that converts the code data so as to further reduce its code quantity; and a code data output unit that outputs the code data, wherein the overwriting unit reads the partial image data of the image data from the first data storing unit to overwrite the partial image data of the image data.

15. An image processing method comprising the steps of:

overwriting a partial image data of an input image data and a partial image data of an image data of which the overwriting processing is not complete;

predicting whether further overwriting is performed upon the partial image data;

generating a code data by performing a predetermined image compression coding upon the partial image data of which the overwriting is complete;

storing the partial image or code data; and decoding the code data by an inverse process of the predetermined image compression coding, wherein a judgment of whether the overwriting process is complete or not complete is based on the predicting of whether further overwriting is performed upon the partial image data.

16. An image processing apparatus that sequentially overwrites an image data with another image data comprising;

an image data storing unit that stores an image data being overwritten;

an image data input unit that inputs a partial image data;

an overwriting processing unit that partially overwrites the image data stored in the image data storing unit with the input partial image data;

a predicting unit that predicts whether further overwriting is performed; and a controlling unit that stores in the image data storing unit the overwritten partial image data that is predicted to have a further overwriting processing without coding, and after coding otherwise, wherein the overwriting processing unit reads from the image data stored in the image data storing unit to partially overwrite the image data stored in the image data storing unit with the input partial image data.

17. An image processing apparatus that sequentially overwrites an image data with another image data comprising:

an image input unit that inputs a partial image data;

a first image data storing unit that stores a non-coded image data being overwritten;

a second image data storing unit that stores a coded image data being overwritten;

an overwriting processing unit that partially overwrites the non-coded image data stored in the first image data storing unit with the partial image data;

a first control unit that stores the non-coded overwritten image data in the first image data storing unit; and a second control unit that stores the coded image data being overwritten in the second image data storing unit, wherein the overwriting processing unit reads from the non-coded image data stored in the first image data storing unit to partially overwrite the non-coded image data stored in the first image data storing unit with the partial image data.

* * * * *